United States Patent [19]

Rayner

[11] 4,205,344
[45] May 27, 1980

[54] SPECIAL EFFECTS MEMORY SYSTEM

[75] Inventor: Bruce L. Rayner, Nevada City, Calif.

[73] Assignee: The Grass Valley Group, Grass Valley, Calif.

[21] Appl. No.: 912,900

[22] Filed: Jun. 5, 1978

[51] Int. Cl.² ............................................. H04N 7/00
[52] U.S. Cl. ..................................... 358/160; 358/185
[58] Field of Search ............... 358/21 R, 22, 160, 181, 358/182, 183, 185

[56] References Cited
U.S. PATENT DOCUMENTS
3,627,914  12/1971  Davies ................................ 358/185

Primary Examiner—James W. Moffitt
Assistant Examiner—Joseph A. Popek
Attorney, Agent, or Firm—William D. Haffner

[57] ABSTRACT

A special effects memory system is described which stores and recalls on command complex configurations of a video production switcher as an aid in the production of special effects. A stored effect may be recalled by using a single control panel push button.

5 Claims, 5 Drawing Figures

SPECIAL EFFECTS MEMORY SYSTEM

BACKGROUND OF THE INVENTION

The present invention relates generally to special effects systems for television production switchers, and more particularly to a system that is capable of providing memory and certain other intelligent functions for a television production switcher.

As is well known, operation of a television production switcher is very complex. For those interested, a description of switcher operation may be found in "Television Broadcasting: Equipment, Systems, and Operating Fundamentals" written by Harold E. Innes and published in 1971 by Howard W. Sams, Inc.

Creating a special effect entails the exact setup of various interacting controls and switches. It is especially difficult to recreate a complex special effect after it has been executed once and switcher controls have been altered. No prior art production switcher provides a simple, reliable way to recreate complex special effects.

It is known, from prior art program control systems such as descirbed in U.S. Pat. No. 3,627,914 granted to K. P. Davies and U.S. Pat. No. 2,969,427 granted to H. P. Lee, to automate master control switchers using a computer and keyboard. However, it would be cumbersome and impractical to program a production switcher with a alphanumeric keyboard.

SUMMARY OF THE INVENTION

In accordance with the preferred embodiment of this invention, a special effects memory system which can be added to a conventional video production switcher stores and recalls on command analog and digital control voltages of the production switcher.

The control cables of the production switcher are looped through the special effects memory system. This gives the special effects memory system access to all switcher control panel controls. The switcher control signals are connected to analog and digital interface modules and then passed onto a microcomputer where they are stored or processed. An operating program, stored in the microcomputer's read-only memory (ROM), interprets commands from the special effects memory system control panel.

The digital interface module receives switch on/off information from the switcher control panel. These digital interface modules are bidirectional such that the status of a switch can be detected from the voltage level of the interface line or the switch can be turned on or off over the same line by the microcomputer. The analog interface receives analog control signals from the switcher control panel and converts them to digital form for processing or storage by the microcomputer. A corresponding digital-to-analog conversion recreates the original analog signal level from the stored value. These recreated analog signals are sent to the video matrix and control electronics of the switcher.

It is a primary purpose of this invention to provide a type of switcher programming that is flexible, easy-to-learn, and compatible with normal production switcher operation.

It is a further object of this invention to provide an automation system that can be easily overridden and does not lock out manual control.

It is another object of this invention to provide a system that can store and recall video special effects on command.

It is still another object of this invention to provide single button recall of special effects.

The invention, however, both as to organization and method of operation, together with further advantages and objects thereof may best be understood by reference to the following description taken in connection with the accompanying drawings wherein like reference numerals refer to like elements.

DETAILED DESCRIPTION OF THE INVENTION

Figure 1:
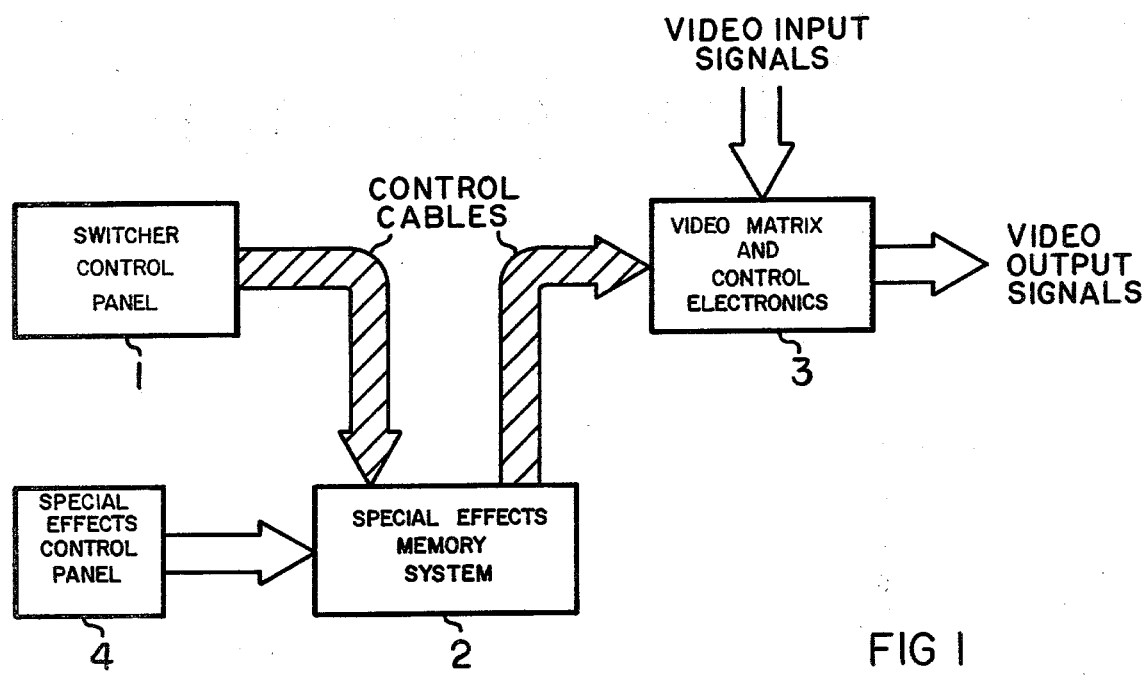
FIG. 1 is a block diagram representation of a video production switching system incorporating the present invention.

Turning now to the drawings, FIG. 1 depicts how the present invention fits into a conventional video production switching system. The control cables from the switcher control panel 1 are looped through the special effects memory system 2. Thus, the special effects memory system has access to all of the control signals from the switcher control panel. These control signals can then be processed and stored by the special effects memory system and passed on to the video matrix and control electronics 3 of the video production switcher. There must be one special effects memory system for each special effects system of the switcher. The various operating functions of the special effects memory system are selected via control panel 4.

Figure 2:
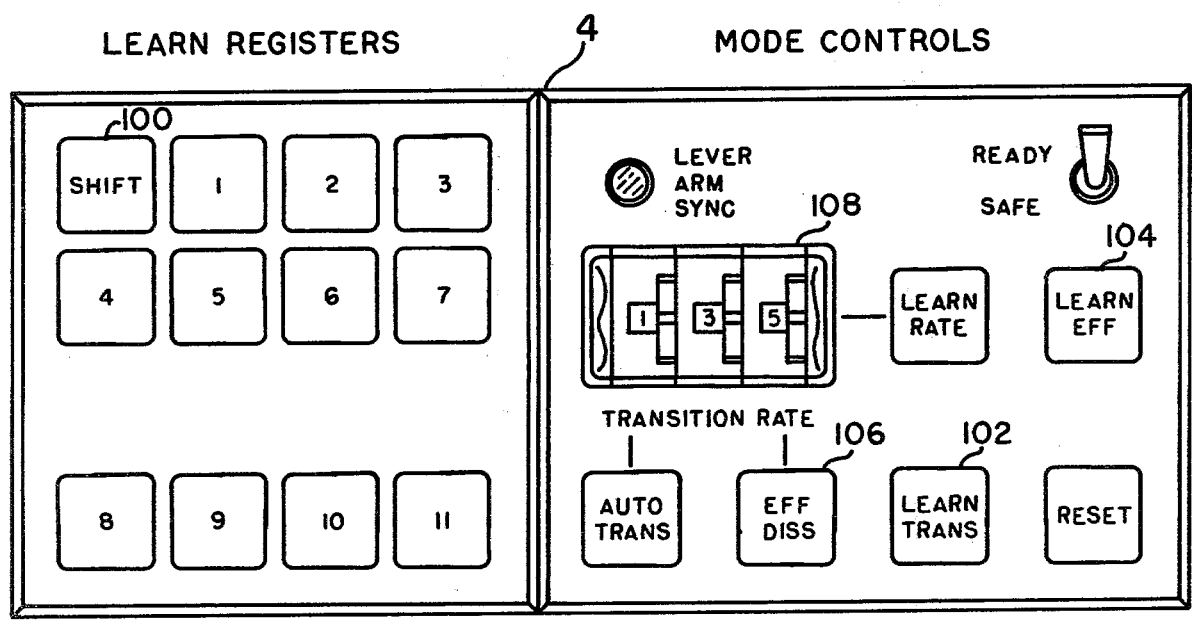
FIG. 2 is a drawing of the control panel of the preferred embodiment of the present invention.

FIG. 2 shows a control panel 4 of the preferred embodiment of the present invention. The mode controls on the right-hand side of control panel 4 select the various operating modes of the special effects memory system. The pushbuttons on the left-hand side of control panel 4 select the storage registers wherein special effects can be stored. In this embodiment there are 22 registers (11 registers plus a shift key; e.g., register 1 shifted is register 12, register 2 shifted is register 13, etc.) shown; however, any number of registers may be incorporated to meet system requirements.

Operation of control panel 4 is straight forward. The operator merely selects operating modes and learn registers by pushing the appropriately labelled panel pushbutton. For example, to cause the system to learn a special effect, the operator first sets the operating controls and switches of the production switcher to create the desired effect. Next, he presses the LEARN EFF push button 104 and a learn register pushbutton. Then he may store other special effects in any or all of the remaining learn registers by using the above described procedure. To recall any of the stored effects, he presses the pushbutton of the learn register wherein the desired effect is stored. The effect is then automatically executed. Stored effects may be executed in any order.

Using the effects dissolve function and learn registers, the operator can cause the switcher's operating (analog) controls to change from one preset value to another preset value simultaneously. For example, the operator creates an effect with a square, bordered insert in one corner of the video monitor screen and stores it in a learn register using the previously described procedure. He then creates a second effect by moving the square to another corner of the screen, changing its size, aspect ratio, border color, etc. The two learn registers wherein the special effects are stored can be used as end points of an effects dissolve. To start the dissolve, the operator selects the transition time with thumbwheel switch 108, recalls the starting point effect, and presses the EFF DISS pushbutton 106. He then recalls the ending point effect and the transition will begin. The square will move across the screen, its size, border color, and aspect ratio changing as it moves.

The operator can also use learn mode programming to create a transition at an uneven rate. For example, the operator presses the LEARN TRANS pushbutton 102 and a learn register pushbutton, moves the switcher lever arms to create an uneven transition, and the motion of the lever arm is stored in the selected learn register. Of course, this uneven transition may be recalled at a later time.

It can be seen from the foregoing description that various combinations of stored special effects are possible and only a few representative examples have been described. It is evident that the ability of the present invention to store and recall, on command, the analog and digital control voltages of a video production switcher is very useful.

Figure 3:
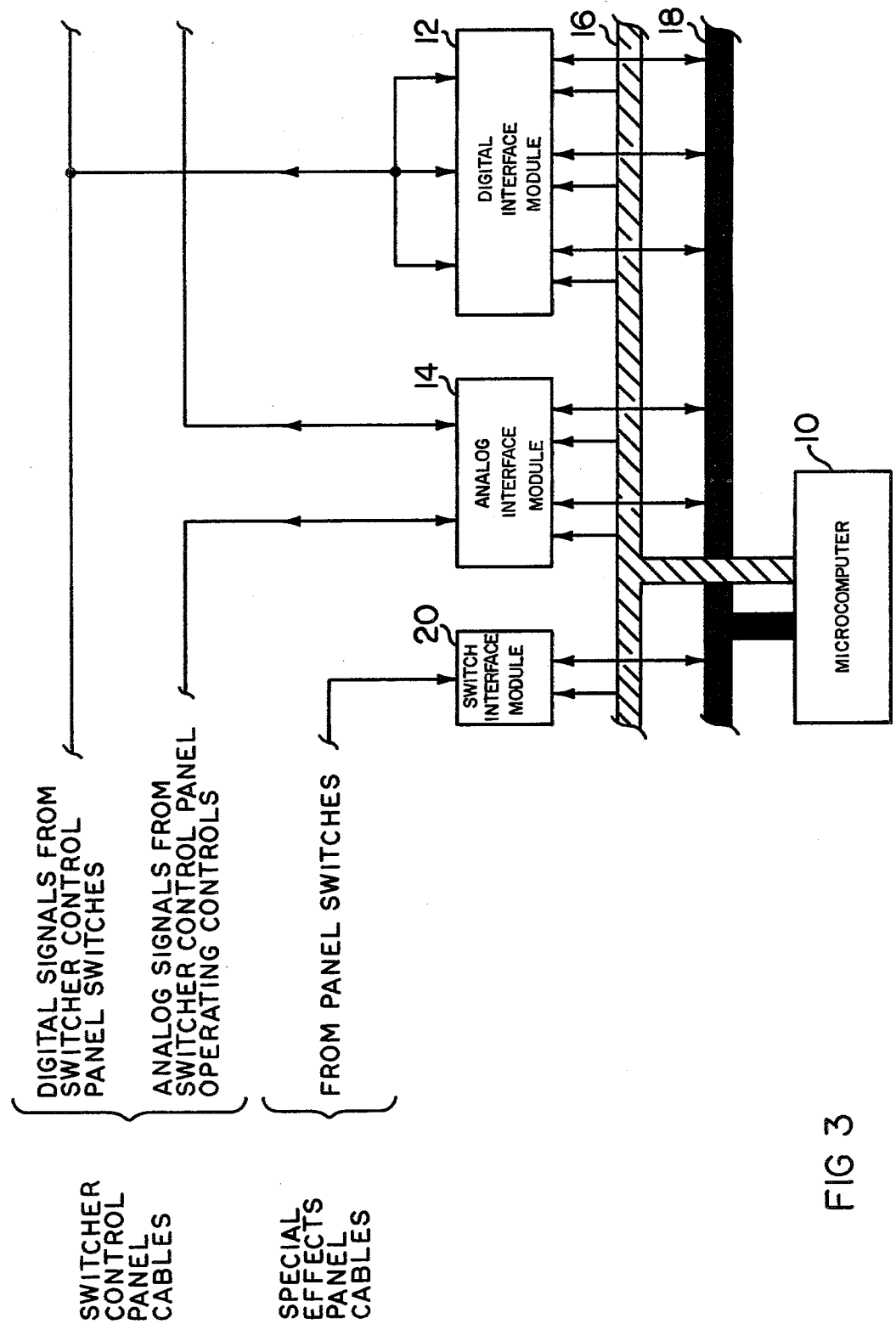
FIG. 3 is a block diagram showing the logical interconnection of the various components of the preferred embodiment of the present invention.

As previously mentioned, the control cables of a conventional video production switcher are looped through the special effects memory system. FIG. 3 shows a simplified block diagram of the referred embodiment of the present invention. Connections from the switcher control cables are made to interface modules 12 and 14. Digital interface module 12 receives digital control signals while analog interface module 14 receives analog control signals. Interface module 20 receives commands, in the form of digital control signals, from the special effects memory system control panel. All control data is fed to the microcomputer 10 where it is stored or processed. Data is exchanged over a bi-directional data bus 18 which is connected between the interface modules and microcomputer 10. Microcomputer 10 addresses the interface modules via the common address bus 16.

The microcomputer 10 used in the preferred embodiment consists of standard, commercially available components. Included are the usual microprocessor unit (MPU), read-only memories (ROM), random access memories (RAM), and parallel input/output adapters. The components used are of the Motorola M6800 family. Detailed discussion of the interconnection, operation, and programming of the microcomputer is not presented because a detailed discussion of such units, including timing diagrams, block and extended block diagrams, details on reading data from memory or writing data in memory, flow charts, and signal descriptions, is given in the "M6800 Microprocessor Applications Manual" published in 1975 by Motorola, Inc. The microprocessor is discussed in U.S. Pat. No. 3,962,682 and the parallel input/output adapters are described in U.S. Pat. No. 3,979,730. Using the foregoing references, a person skilled in the art could construct a microcomputer such as that required to implement the present invention.

The microcomputer operating program stored in ROM receives commands from the special effects memory system control panel 4 via interface module 20 and data bus 18. The operating program interprets these commands and performs the steps that determine the characteristics of the system; e.g., reading in the analog and digital control settings of the production switcher, storing them in a learn register, and sending the control settings back to the production switcher on command.

In order to process the analog and digital control signals from the production switcher panel, the microcomputer uses the previously mentioned parallel input/output adaptors to gain access to the analog and digital interface modules. This access is accomplished by a time multiplexing process. Each control function of the production switcher, analog and digital, is assigned a specific address. When a control function is addressed by the microcomputer, its status is placed on the data bus where it is read. All addresses are scanned once every television field; i.e., 60 times per second.

The ability of the present invention to effectively store and recall on demand the analog and digital control voltages is a result of the function of the analog and digital interface modules.

Figure 4:
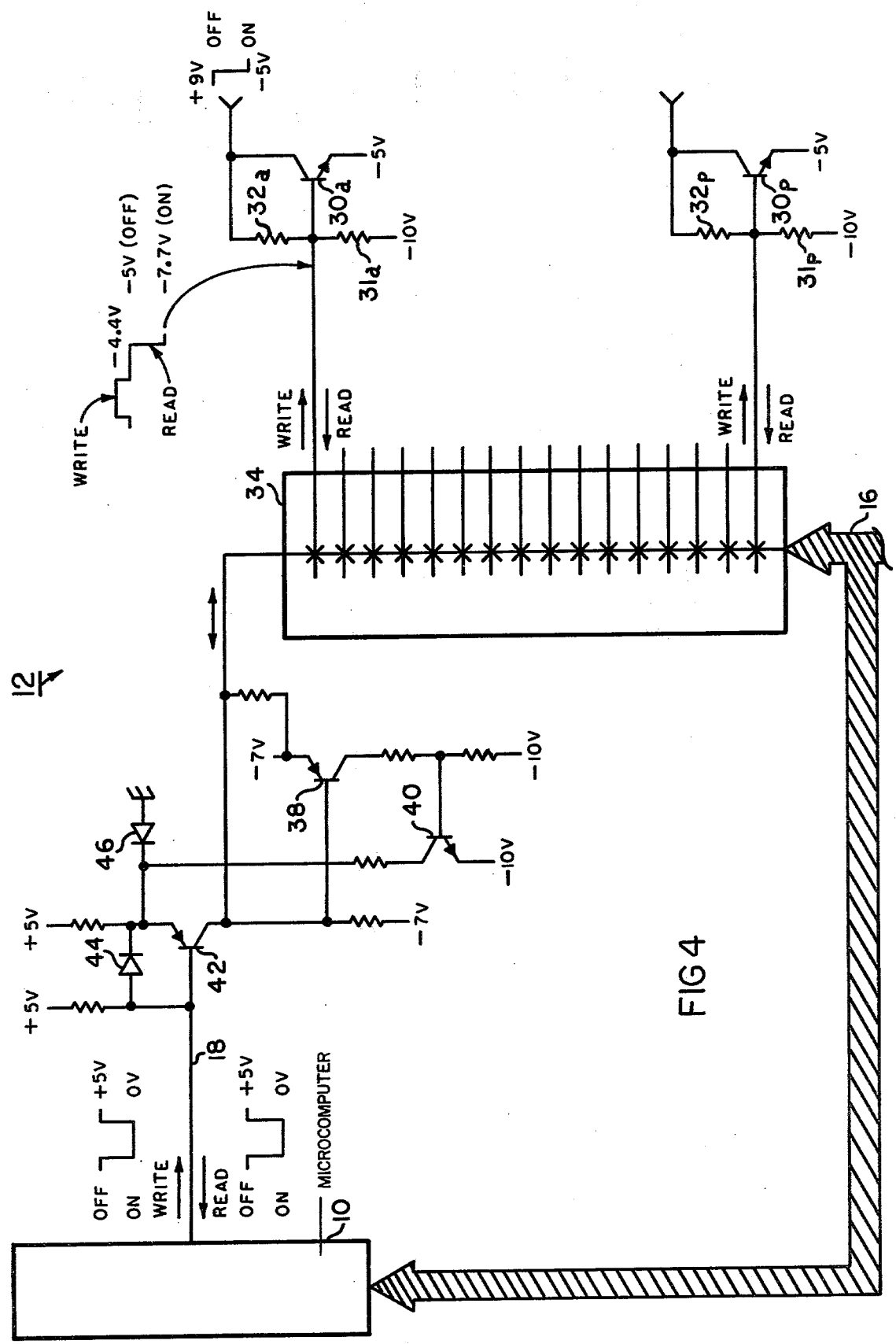
FIG. 4 is a schematic diagram of the preferred embodiment of a digital interface module.

A typical digital interface module is shown in FIG. 4. On/off information from each switch on the production switcher control panel 1 is applied to the collector of NPN transistors $30a$ through $30p$. There is one transistor 30 for each switch on the production switcher control panel. The preferred embodiment includes sixteen of these transistors. The collector of each transistor 30 is connected to a multiplex switch or channel in 2 conventional 16-channel CMOS multiplexer 34, which may be comprised of commercially available MC4051 multiplexers. These desiring information on the operation of multiplexers are referred to the "Analog-Digital Conversion Handbook" edited D. H. Sheingold and published by Analog Devices, Inc. (see Part III, Chapter 3). Address bus 16 is used by the microcomputer to sequentially address each channel of the multiplexer 60 times per second. The bi-directional serial output bus of multiplexer 34 is connected to the collector of PNP transistor 42, the base of which is connected to microcomputer 10.

The digital interface module operates in a bi-directional manner; i.e., the status of a switch can be detected by the microcomputer or set by it over the same line. In the Read Mode, the microcomputer detects the voltage level of a production switcher control panel switch and stores it in a learn register. In the Write Mode, the microcomputer places a stored voltage level on the same line which turns a specified control panel switch on or off. Thus, the Read Mode corresponds to learning the status of a control panel switch and the Write Mode corresponds to recalling the status of a switch.

In order to best understand the operation of the digital interface module, first consider the Read Mode operation. For purposes of illustration only one switch and one channel of the multiplexer will be considered. In the Read Mode, +9 volts, representing an "off" switch; or −5 volts, representing an "on" switch, is applied to the collector of transistor $30a$. This voltage level is transferred to multiplexer 34 by the divider network comprised of resistors $31a$ and $32a$. This divider network is biased to −10 volts which prevents transistor $30a$ from turning on during the Read Mode. A level of −5 volts from the divider represents an "off" switch and −7.7 volts represents an "on" switch. When microcomputer 10 addresses the appropriate multiplexer channel via address bus 16, the output of the divider network is transferred to the output bus of multiplexer 34. In the case of an "on" switch, the −7.7-volt level is applied to the base of transistor 38, turning it on. The conduction of transistor 38 causes current to flow through transistor 40. This pulls the collector of transistor 40 down to 0 volts through diode 46. Thus, transistor 42 is disabled and the 0-volt level is coupled to the microcomputer via diode 44. This 0-volt level represents an "on" switch to the microcomputer circuitry and is stored and processed as such. A similar process occurs for an "off" switch; i.e., the original +9-volt level from the switcher control panel is multiplexed and converted to +5 volts to be stored by the microcomputer.

In the Write Mode, the microcomputer takes the initiative and outputs a stored voltage value, a +5-volt level representing an "off" switch and a 0-volt level representing an "on" switch, to the base of transistor 42. In the case of an "on" switch, the 0 volt level turns transistor 42 on, pulling the multiplex bus up from −7 volts toward 0 volts. Transistor 38 is held off and current flows into, rather than away from, the bi-directional output bus of multiplexer 34. When the microcomputer addresses the same multiplexer channel that was addressed in the Read Mode, the voltage level on the multiplexer output bus is switched to the base of transistor 30a. This voltage is positive enough (approximately −4.4 volts) to turn on transistor 30a. The voltage at the collector of transistor 30a falls to −5 volts and the corresponding switcher control panel switch is turned "on". A similar process occurs for an "off" switch; i.e., the microcomputer outputs a +5-volt level which is multiplexed and converted to +9 volts to turn a switcher control panel switch "off." Thus, the same circuitry is used to learn and recall switch status information.

Each channel of the multiplexer is scanned 60 times per second by the microcomputer. This is for purposes of updating the contents of the learn registers and the status of the switcher control panel switches.

Figure 5:
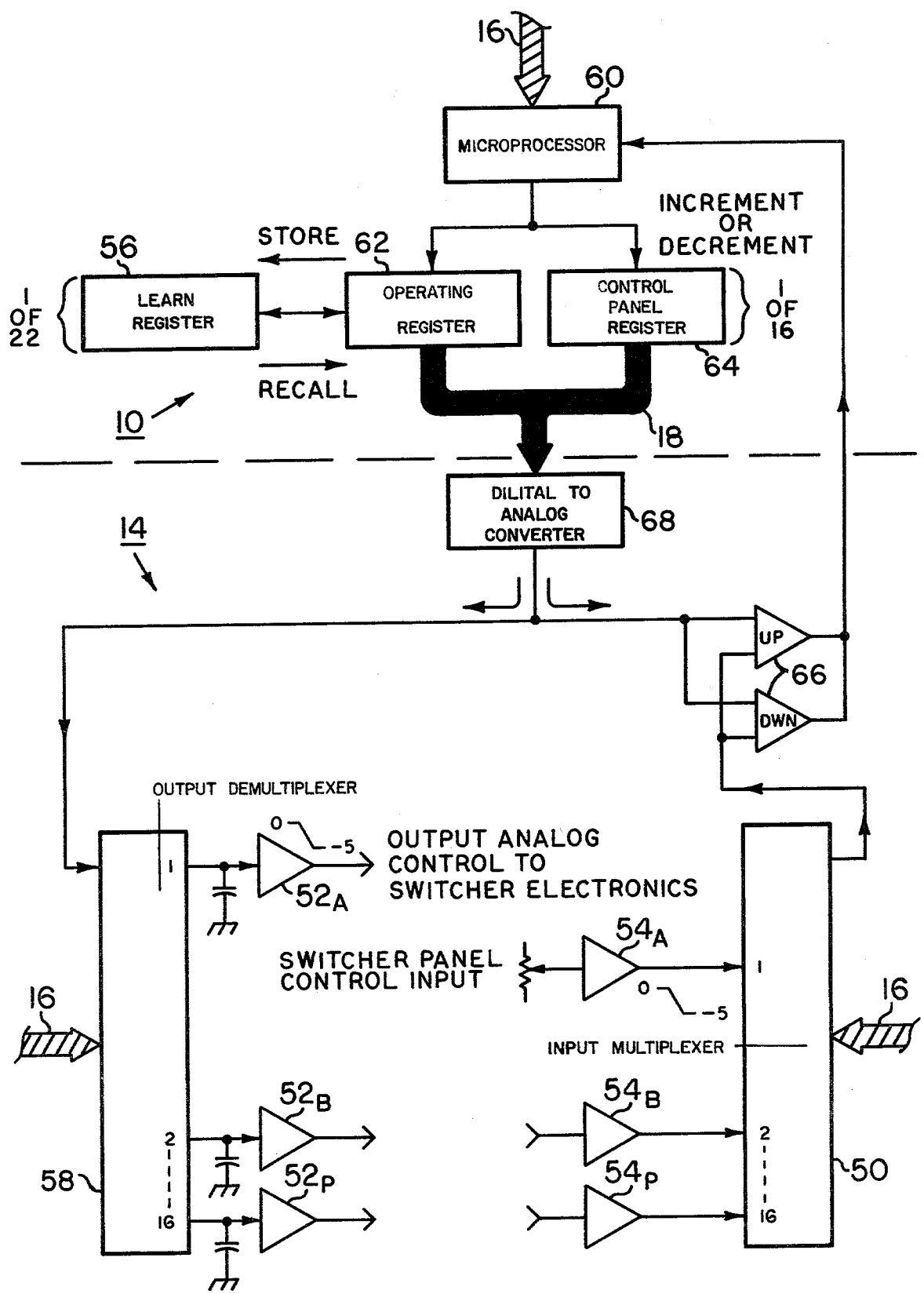
FIG. 5 is a block diagram of an analog interface module and part of the microcomputer.

Turning now to the analog interface, a typical analog interface module is shown in FIG. 5. Also shown in FIG. 5 is a portion of microcomputer 10. Analog control voltages from the analog controls (potentiometers) of the video production switcher control panel are connected to the 16 input amplifiers 54A through 54P. Each of these amplifiers is connected to a switch or channel in conventional 16-channel CMOS multiplexer 50. The output of multiplexer 50 is compared with the output of digital-to-analog converter (DAC) 68 by comparator 66. The result of the comparison is fed to microprocessor 60 and used to update the control panel register 64 and operating register 62. The output of register 64 is connected to DAC 68 where it is converted to an analog voltage. This analog voltage is routed to video matrix and switcher control electronics 3 via multiplexer 58 and one of sample-and-hold amplifiers 52A-52P.

The analog interface module performs a continuous analog-to-digital and digital-to-analog conversion using a single DAC. This conversion is accomplished by using the closed-loop technique described below.

In the preferred embodiment, there are sixteen analog controls being automated; therefore, there are sixteen identical input amplifiers, control panel registers, operating registers; etc. However, for the sake of illustration, only one switcher control and its associated components will be discussed.

Input amplifier 54A receives an analog control voltage from one of the switcher analog controls. This control voltage is conditioned by amplifier 54A to be between 0 and −5 volts. When the multiplexer channel corresponding to input amplifier 54A is addressed by the microcomputer 10 via address bus 16, the analog voltage from amplifier 54A is switched to the output bus of multiplexer 50 where it is compared with the previous analog control voltage from the operating register 62 for that channel. If, for example, the stored voltage is more positive than the present voltage, the negative voltage out of the comparator 66 causes microprocessor 60 to decrement control panel register 64 and operating register 62 by one count each. The digital information stored in control panel register 44 is converted to an analog voltage and compared to the present voltage again. If there is still a difference, microprocessor 60 decrements the registers again by one count. This process continues until the voltage stored in control panel register 44 is equal to the present voltage from the control. At that point, the microcomputer addresses the next multiplexer channel. Each channel is addressed sequentially until all sixteen control panel registers are loaded with the digital equivalent of the present analog control voltages. All sixteen control panel registers are updated during each television field. At the beginning of each television field and before the microprocessor updates the control panel registers, the digital information stored in the operating register (initially the same as that stored in the control panel register) is converted by DAC 68 to its equivalent analog voltage. This voltage is applied to the production switcher video matrix and control electronics 3 through de-multiplexer 58 and sample and hold amplifier 52A. Amplifier 52A is adjusted to yield a steady state voltage between 0 and −5 volts. Thus, the output to the production switcher video matrix and control electronics 3 is the same as the input to the control panel multiplexer 50. The purpose of the above described circuitry is to sample all analog control panel settings, store them digitally, and convert them back to analog voltages that are applied to the switcher video matrix and electronics to produce a special effect. The DAC 68 and sample-and-hold amplifiers 52A-52P may be any commercially available version thereof. The previously mentioned book "Analog Digital Conversion Handbook" describes the operation of these devices in Part II and Part III, Chapter 4, respectively.

At any time during the operation of the special effects memory system, the operator may store the present switcher control settings in one of the learn registers 56. As previously described, this is accomplished by pressing a learn register pushbutton 100. When this is done, the microprocessor loads the contents of all sixteen operating registers 62 into the selected learn register (the on/off information from the control panel switches is also loaded into the learn register). As the switcher is operated, the control panel registers 64 and operating registers 62 are continuously updated to reflect the present control panel settings, but the contents of the learn registers 56 remain unchanged.

When the operator recalls a stored effect, the contents of the specified learn register are loaded into the operating registers, replacing their current contents. The contents of the operating registers are sequentially converted to analog voltages and applied to the production switcher video matrix and control electronics 3. The effect produced is the one which was previously stored in the specified learn register. For example, the production switcher hue control may be set to green and the recalled hue may be yellow. Thus, the hue of the displayed special effect will be yellow even though the hue control is set to green. It is possible, however, for the operator to modify or override the recalled effect. He need merely change any analog control as desired. As an analog control is changed, the control panel register *and operating register* are incremented or decremented. The control panel register will contain the exact setting of the production switcher analog control and the operating register contains the setting of the analog control offset by the recalled analog voltage. It is the contents of the operating register which determines what is displayed on the video display. The operating and control panel registers will continue to track each other; thus, allowing smooth modification of the effect. If the operating register, due to an offset caused by a recall, reaches a limit (0 or −5 volts) while the analog control is at mid-range, the microprocessor holds the contents of the operating register steady until the switcher control is equal to it. On the other hand, if the analog control reaches a limit while the operating register is at midrange, the microprocessor increments the operating register at an even rate until its contents equal the setting of the analog control or the control is turned in the opposite direction.

While there has been shown and described a preferred embodiment of the present invention, it will be apparent to those skilled in the art that many changes and modifications may be made without departing from the invention in its broader aspects. Therefore, the appended claims are intended to cover all such modifications and changes that fall within the true spirit and scope of the invention.

The invention is claimed in accordance with the following:

1. A special effects system for use with a television production switching system; the special effects system comprising:
   a source of digital input signals representing switch on/off settings of the television production switching system;
   a source of analog input signals representing analog control settings of the television production switching system;
   means for storing said digital input signals and digital equivalents of said analog input signals; and
   an addressable bi-directional analog interface connected between said analog input signal source and said storage means, said analog interface comprising:
   (a) addressable means for selecting one of said analog input signals, said selecting means being responsive to input address commands;
   (b) means connected to said storage means for converting the selected ones of said analog input signals to said digital equivalents for storing in said storage means and also for converting said stored digital equivalents to analog output signals; and
   (c) addressable means for connecting one of said analog output signals to the television production switching system for controlling the operation thereof, said connection means being responsive to output address commands.

2. The special effects system according to claim 1 further comprising a bi-directional digital interface connected between said digital input signal source and said storage means for routing said digital input signals therebetween.

3. The special effects system according to claim 1 wherein said addressable selection means comprises a multiplexer.

4. The special effects system according to claim 1 wherein said addressable connection means comprises a demultiplexer.

5. The special effects system according to claim 1 wherein said storage means comprises a microcomputer.

* * * * *

UNITED STATES PATENT AND TRADEMARK OFFICE
CERTIFICATE OF CORRECTION

PATENT NO. : 4,205,344
DATED : May 27, 1980
INVENTOR(S) : Bruce Leland Rayner

It is certified that error appears in the above-identified patent and that said Letters Patent are hereby corrected as shown below:

Col. 1, line 25, reads "descirbed" should be --described--.

Col. 4, line 13, reads "switcher panel" should be --switcher control panel--.

Col. 6, line 18, reads "register 44" should be --register 44--.

Col. 6, line 23, reads "register 44" should be --register 44--.

Signed and Sealed this

Twenty-fifth Day of November 1980

[SEAL]

Attest:

SIDNEY A. DIAMOND

Attesting Officer

Commissioner of Patents and Trademar